(12) United States Patent
Gill

(10) Patent No.: US 6,914,760 B2
(45) Date of Patent: Jul. 5, 2005

(54) HARD BIAS LAYER FOR READ HEADS

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 09/948,910

(22) Filed: Sep. 7, 2001

(65) Prior Publication Data
US 2003/0048585 A1 Mar. 13, 2003

(51) Int. Cl.⁷ .................................................. G11B 5/33
(52) U.S. Cl. .................................................. 360/324.12
(58) Field of Search ........................ 360/324.12, 327.32, 360/126, 374.1, 327.22, 327.31; 428/692

(56) References Cited

U.S. PATENT DOCUMENTS

| | | | | |
|---|---|---|---|---|
| 5,880,913 A | | 3/1999 | Gill | 360/324.1 |
| 5,995,338 A | * | 11/1999 | Watanabe et al. | 360/324.12 |
| 6,061,210 A | | 5/2000 | Gill | 360/324.1 |
| 6,128,167 A | * | 10/2000 | Saito et al. | 360/324.12 |
| 6,266,218 B1 | * | 7/2001 | Carey et al. | 360/324.12 |
| 6,307,722 B1 | * | 10/2001 | Sato et al. | 360/324.12 |
| 6,317,301 B2 | * | 11/2001 | Narumi et al. | 360/327.32 |
| 6,324,037 B1 | * | 11/2001 | Zhu et al. | 360/324.12 |
| 6,342,311 B1 | * | 1/2002 | Inturi et al. | 428/692 |
| 6,381,106 B1 | * | 4/2002 | Pinarbasi | 360/324.12 |
| 6,462,918 B2 | * | 10/2002 | Mukouyama | 360/324.12 |
| 6,466,418 B1 | * | 10/2002 | Horng et al. | 360/324.12 |
| 6,556,391 B1 | * | 4/2003 | Aoshima et al. | 360/324.21 |
| 6,633,466 B2 | * | 10/2003 | Sakaguci et al. | 360/327.31 |
| 6,636,400 B2 | * | 10/2003 | Pinarbasi et al. | 360/324.12 |
| 2003/0026047 A1 | * | 2/2003 | Chien et al. | 360/324.1 |

* cited by examiner

Primary Examiner—Tianjie Chen
(74) Attorney, Agent, or Firm—Zilka-Kotab, PC

(57) ABSTRACT

A magnetoresistive (MR) read head is disclosed including a lower shield and gap layer with an MR sensor located on top of the lower gap layer. The MR sensor includes a free layer and a pinned layer. Located on top of the lower gap layer is a three-layer hard bias layer for stabilizing the free layer of the MR sensor. A pair of lead layers is located on top of the hard bias layer and coupled to the MR sensor. Associated therewith is an upper gap and shield layer located on top of the lead layers.

28 Claims, 7 Drawing Sheets

HARD BIAS LAYER FOR READ HEADS

FIELD OF THE INVENTION

The present invention relates to magnetoresistive read sensors for reading signals recorded in a magnetic medium, and more particularly, this invention relates to improving a hard bias layer of a magnetoresistive read sensor to optimize operating characteristics.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR sensor") as a function of the strength and direction of the magnetic flux being sensed by the MR layer.

FIG. 1 illustrates a cross-sectional view of an MR head 100, in accordance with the prior art. As shown, the MR read head 100 includes an MR sensor which is sandwiched between a hard bias layer HB which is in turn sandwiched between first and second shield layers S1 and S2. As is well known, the shield layers may incorporate gap layers G1 and G2 which provide insulation. The hard bias layer HB typically includes an upper layer 102 and a seed layer 104 therebeneath. One exemplary material commonly employed for the upper layer 102 is CoPtCr with the seed layer being constructed with Cr.

Lead layers L1 and L2 are sandwiched between the hard bias layer HB and shield layer G2 for providing a sense current to the MR sensor. Magnetic fields from a magnetic disk change the resistance of the sensor proportional to the strength of the fields. The change in resistance changes the potential across the MR sensor which is processed by channel circuitry as a readback signal.

The MR read head 100 is typically mounted to a slider which, in turn, is attached to a suspension and actuator of a magnetic disk drive. The slider and edges of the MR sensor and other layers of the MR read head 100 form an air bearing surface (ABS). When a magnetic disk is rotated by the drive, the slider and one or more heads are supported against the disk by a cushion of air (an "air bearing") between the disk and the ABS. The air bearing is generated by the rotating disk. The MR read head 100 then reads magnetic flux signals from the rotating disk.

FIG. 2A illustrates a simplified cross-sectional view of the MR head 100 showing the hard bias layer HB and the MR sensor thereof. It should be noted that such simplified illustration is not drawn to scale, and includes crude blocks to simplistically show the overlap between the MR sensor and the hard bias layer HB, and the associated fields.

As shown FIG. 2A, the hard bias layer HB include positive poles 204 and negative poles 206. In use, the positive poles 204 and negative poles 206 of the hard bias layer HB produce first electromagnetic fields 208 in a first direction, and further produce a second electromagnetic field 210 in a second direction.

As shown in FIG. 2A, ends of the hard bias layer HB slightly overlap ends of the MR sensor. This is often the result of inherent defects in a photolithography process. This region of overlap defines a "domain wall" 212. Such domain wall 212 is typically where the first electromagnetic fields 208 of the hard bias layer HB are combated by the second electromagnetic field 210 of the MR sensor. FIG. 2B illustrates the MR sensor and the placement of the domain wall 212. As shown, the domain wall 212 is an area in which the first electromagnetic fields 208 are thwarted by the second electromagnetic field 210. Unfortunately, the overlap and resultant conflicting fields 214 in the MR sensor cause unfavorable noise during the use of the MR head.

One critical dimension of the MR head that affects the capability to read data recorded at high areal densities is the trackwidth TW. Note FIG. 1. The trackwidth TW of the MR read head is the length of the active or sensing region for the MR sensor. Unfortunately, the aforementioned overlap and resultant fields further cause a lack of trackwidth definition by blurring the sensing region.

There is thus a need for an MR head that does not suffer from such adverse noise and lack of trackwidth definition.

Still another characteristic associated with the MR head is the thickness of the hard bias layer HB. Often, such hard bias layer HB is designed to be as thick as possible in order to stabilize the MR sensor. Unfortunately, this increase in hard bias layer thickness results in a reduction in the thickness of the gap layers which are critical for preventing shorts involving the lead layers L1 and L2. This results in a greater occurrence of shorts.

There is thus a need for a MR head that is capable of adequately stabilizing the MR sensor without requiring a thick hard bias layer HB.

DISCLOSURE OF THE INVENTION

A magnetoresistive (MR) read head is disclosed including a lower shield and gap layer with an MR sensor located on top of the lower gap layer. The MR sensor includes a free layer and a pinned layer. Located on top of the lower gap layer is a three-layer hard bias layer for stabilizing the free layer of the MR sensor. A pair of lead layers is located on top of the hard bias layer and coupled to the MR sensor. Associated therewith is an upper gap and shield layer located on top of the lead layers.

In one embodiment, the hard bias layer may include an upper layer constructed with Cr. In particular, the upper layer of the hard bias layer may be constructed with CoPtCr. As an option, the upper layer of the hard bias layer may include a seed layer constructed with FeCr or CoFeCr.

Still yet, the hard bias layer may include a lower layer constructed with Fe. In particular, the lower layer of the hard bias layer may be constructed with $Co_{50}Fe_{50}$.

By this structure, a product of the moment (Ms) and the thickness (t) of the lower layer of the hard bias layer is greater than a product of the moment (Ms) and the thickness (t) of the free layer of the MR sensor. In one embodiment, such product of the entire hard bias layer is at least six to eight times greater than the product associated with the free layer of the MR sensor.

In use, the hard bias layer reduces noise associated with use of the MR sensor. As an option, the MR read head may be configured as a lead overlay read head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
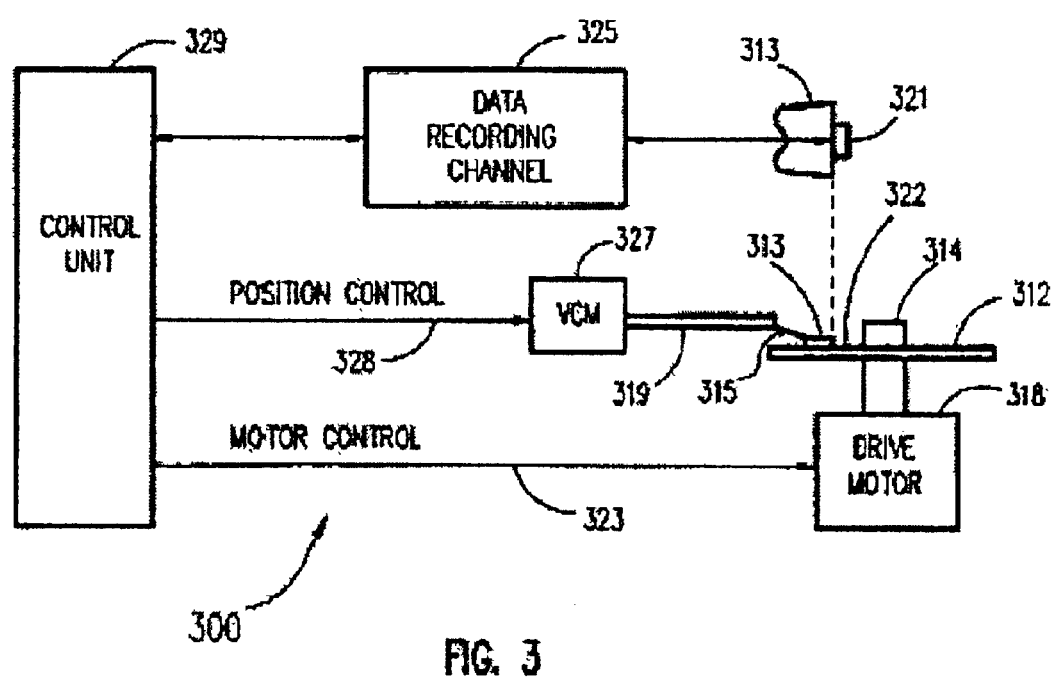
FIG. 3 is a perspective drawing of a magnetic recording disk drive system in accordance with one embodiment of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4:
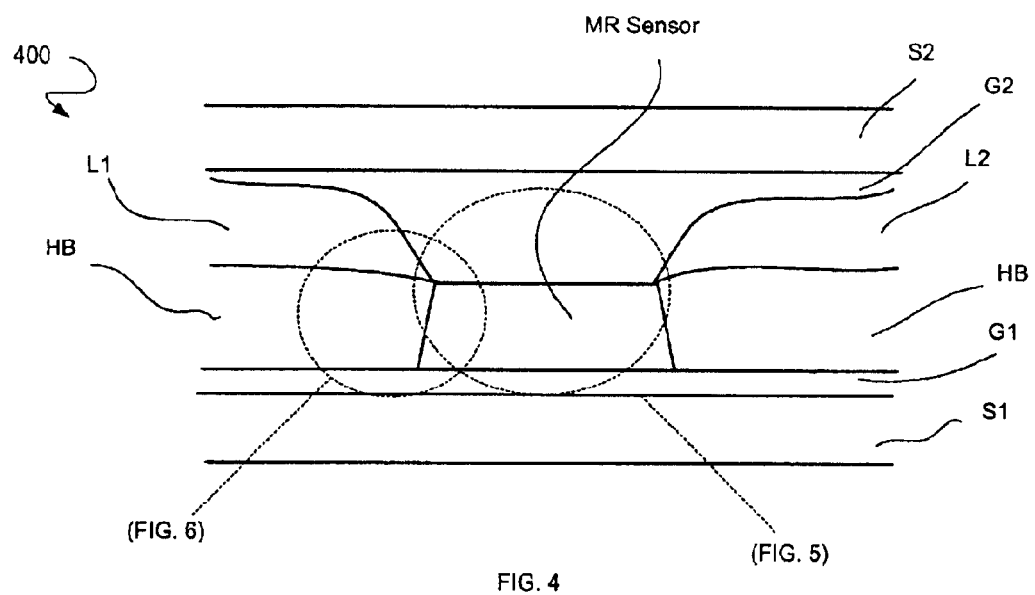
FIG. 4 illustrates an MR read head constructed in accordance with one embodiment of the present invention.

FIG. 4 illustrates an MR read head 400 constructed in accordance with one embodiment of the present invention. As shown, the MR read head 400 includes a lower shield layer S1. Located on top of the lower shield layer S1 is a lower gap layer G1. As is well known, gap layers are typically constructed from $Al_2O_3$ or other insulative materials. An MR sensor is located on top of the lower gap layer G1. As will be set forth in FIG. 5, the MR sensor includes a free layer and a pinned layer. A hard bias layer HB is also positioned on the lower gap layer G1, and includes a ferromagnetic material for stabilizing the free layer of the MR sensor. More information regarding such stabilizing feature will be set forth hereinafter in greater detail during reference to FIG. 6.

A pair of lead layers L1 and L2 is located on top of the hard bias layer HB and coupled to the MR sensor. Associated therewith is an upper gap layer G2 located on top of the lead layers L1 and L2. An upper shield layer S2 is positioned on top of the upper gap layer G2.

Figure 5:
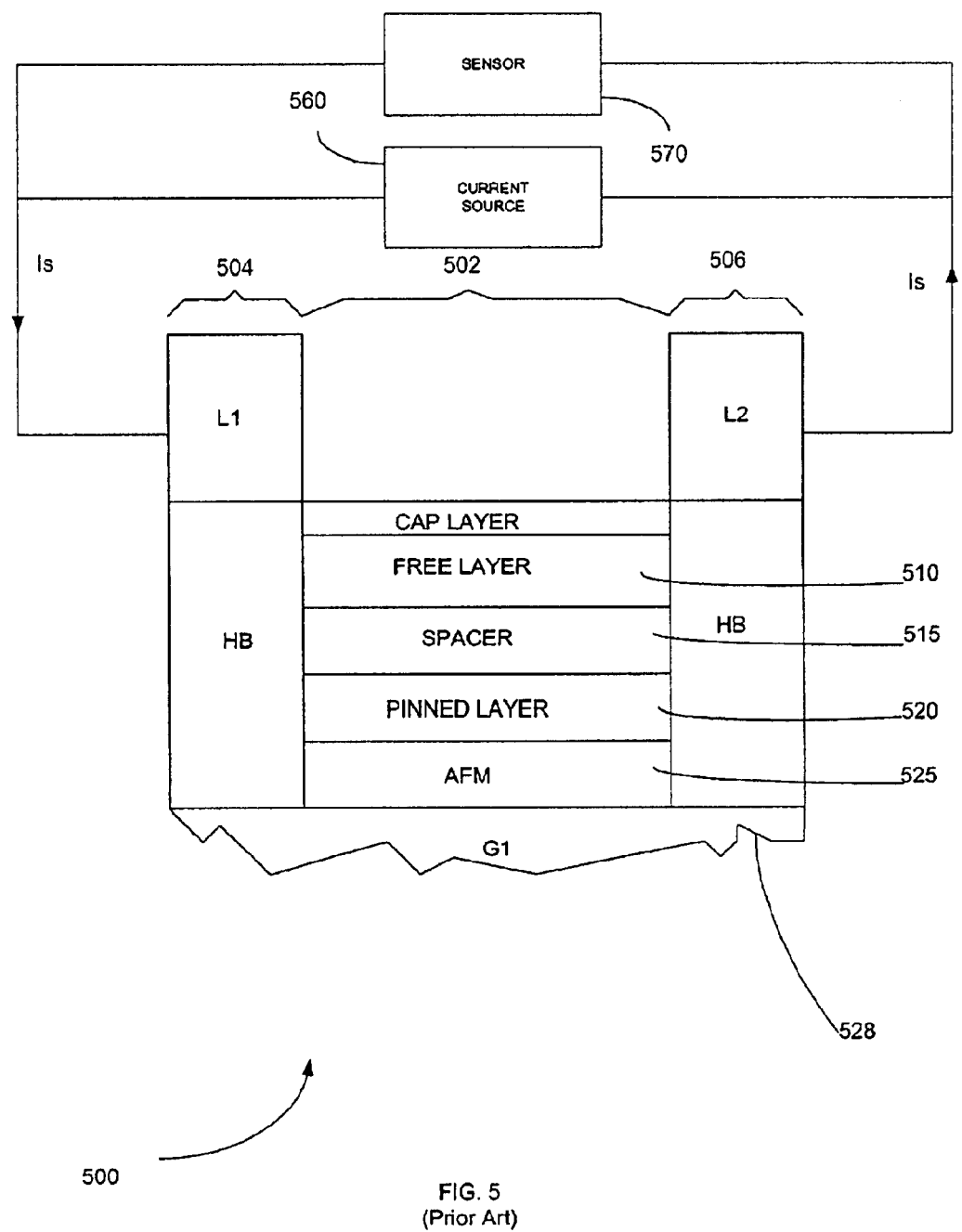
FIG. 5 shows a magnified view of an exemplary embodiment of the MR sensor of FIG. 4.

FIG. 5 shows a magnified view of an exemplary embodiment of the MR sensor 500 of FIG. 4 (not drawn to scale). As shown, the MR sensor 500 comprises end regions 504 and 506 separated by a central region 502. The end regions 504 and 506 are shown to be defined by the lead layers L1 and L2 as well as the hard bias layer HB of FIG. 4.

As shown in FIG. 5, a free layer (free ferromagnetic layer) 510 is separated from a pinned layer (pinned ferromagnetic layer) 520 by a non-magnetic, electrically-conducting spacer 515. The magnetization of the pinned layer 520 is fixed through exchange coupling with an antiferromagnetic (AFM) 525.

Free layer 510, spacer 515, pinned layer 520, and the AFM layer 525 are all formed in the central region 502. The hard bias layer HB formed in the end regions 504 and 506, respectively, provide longitudinal bias for the free layer 510. Leads layers L1 and L2 formed over hard bias layer HB, provide electrical connections for the flow of the sensing current $I_s$ from a current source 560 to the MR sensor 500. Sensor 570 is connected to leads layers L1 and L2 senses the change in the resistance due to changes induced in the free layer 510 by the external magnetic field (e.g., field generated by a data bit stored on a disk).

The above description of the MR sensor 500, and the accompanying illustration of FIG. 5 are for representation purposes only. It should be noted that other types of MR sensors may be readily used in the context of the present invention. For example, another type of MR sensor that may be used is an anti-parallel (AP)-pinned sensor.

Figure 6:
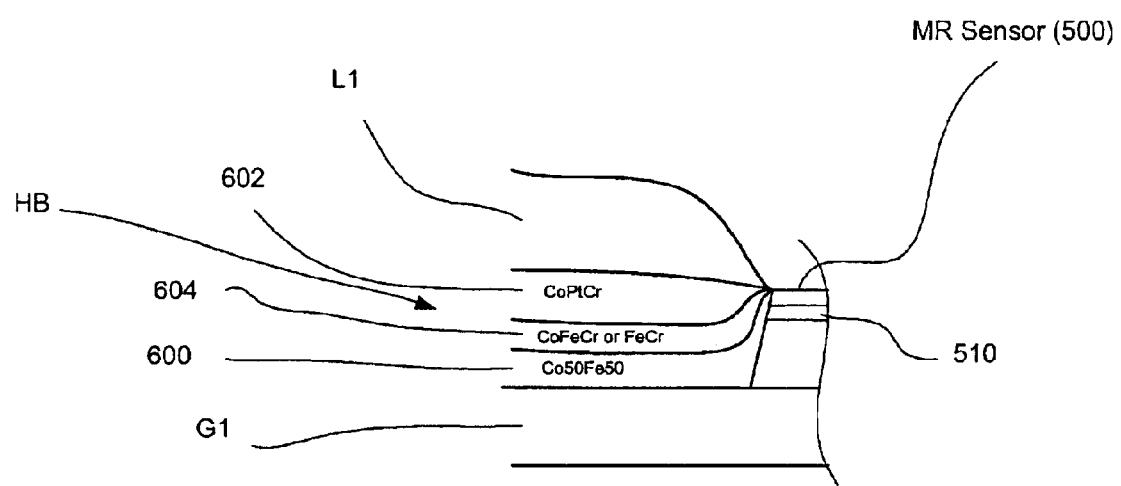
FIG. 6 illustrates a magnified view of an exemplary embodiment of the hard bias layer of FIG. 4 and its relation to the free layer of the MR sensor.

FIG. 6 illustrates a magnified view of the hard bias layer HB of FIG. 4 and its relation to the free layer 510 of the MR sensor 500. As mentioned earlier, the hard bias layer HB includes a ferromagnetic material for stabilizing the free layer 510 of the MR sensor 500. This may be accomplished by the hard bias layer HB including a lower layer 600 constructed with Fe. As shown in FIG. 6, the lower layer 600 of the hard bias layer HB creates an abutted junction with the MR sensor 500 in order for the lower layer 600 to reside as close to the free layer 510 of the MR sensor 500 as possible.

As an option, the lower layer 600 of the hard bias layer HB may preferably be constructed with $Co_{50}Fe_{50}$. Further, a product [Ms*t] of the moment (Ms) and the thickness (t) of the lower layer 600 of the hard bias layer HB may be greater than a product [Ms*t] of the moment (Ms) and the thickness (t) of the free layer 510 of the MR sensor 500.

In one embodiment, the hard bias layer HB may further include an upper layer 602 constructed with Cr. It is well known that Cr affords high coersivity (Hc), and thus provides the upper layer 602 with a magnetic field that remains suitably pinned during use. In a more specific embodiment, the upper layer 602 of the hard bias layer HB may be constructed with CoPtCr. As an option, the upper layer 602 of the hard bias layer HB may further include a seed layer 604 constructed with FeCr or CoFeCr. In a preferred embodiment, the seed layer 604 includes a body centric cubic (BCC) crystallographic structure which is magnetically coupled to the other layers of the hard bias layer HB and the MR sensor. In particular, the body centric cubic (BCC) crystallographic structure contributes to the coersivity of the upper layer 602.

In one embodiment, the lower layer 600, upper layer 602, and seed layer 604 of the hard bias layer HB may be ferromagnetically coupled. Moreover, a product [Ms*t] of the moment (Ms) and the thickness (t) of the entire hard bias layer HB (i.e. lower layer 600, upper layer 602, and seed layer 604 combined) is at least six (6) to eight (8) times greater than a product [Ms*t] of the moment (Ms) and the thickness (t) of the free layer 510 of the MR sensor 500. Table 1 illustrates a summary of the various characteristics of the lower layer 600, upper layer 602, and seed layer 600 of the hard bias layer HB.

TABLE 1

| |
| --- |
| Lower layer (600): [Ms*t] > Free layer (510): [Ms*t] |
| Seed layer (604) [Ms*t] --> BCC |
| Upper layer (602) provides high Hc |
| Hard bias layer HB: [Ms*t] > 8* [Free layer (510): [Ms*t]] |

It should be noted that the MR read head may be configured as any type of head per the desires of the user. For example, the MR read head may be configured as a lead overlay read head.

Figure 1:
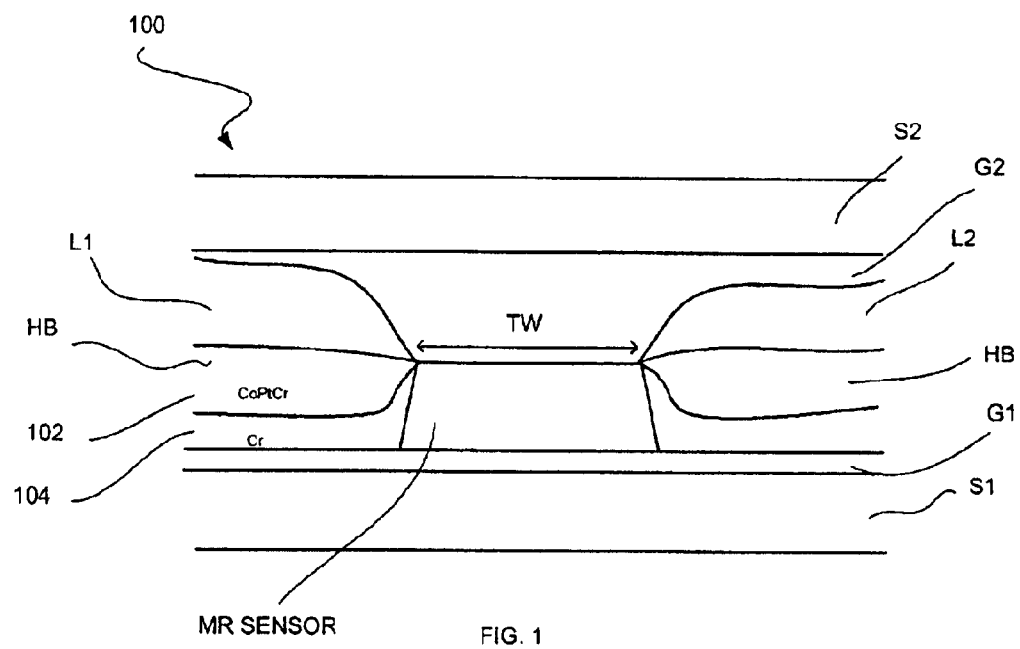
FIG. 1 illustrates a cross-sectional view of an MR head, in accordance with the prior art.
Figure 2A:
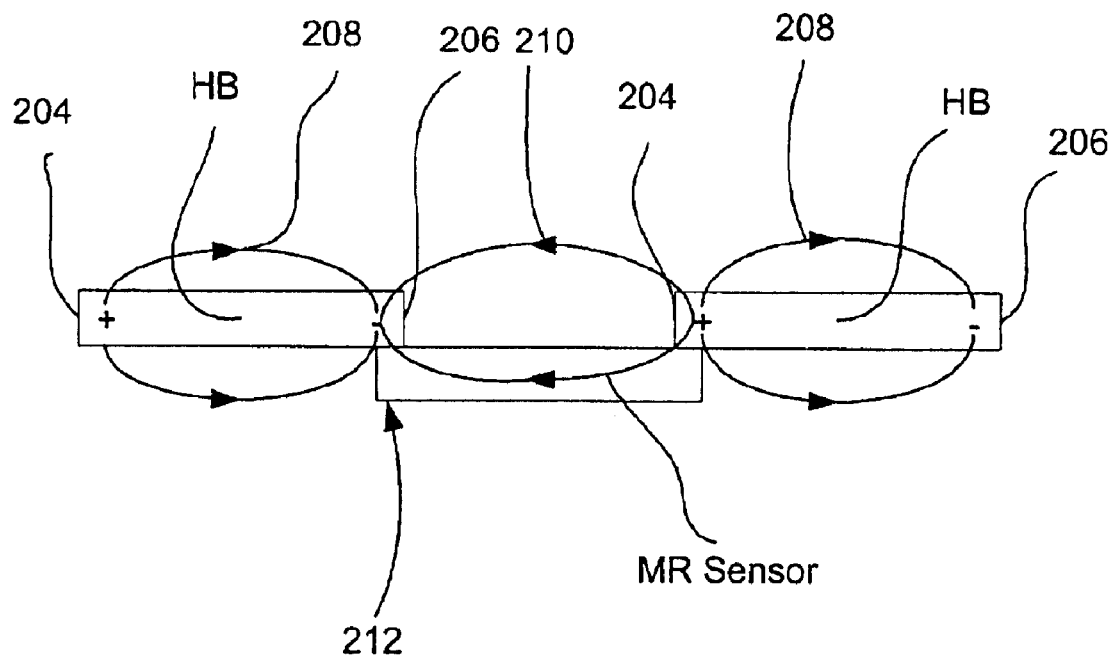
FIG. 2A illustrates a simplified cross-sectional view of the MR head showing the hard bias layer and the MR sensor thereof.
Figure 2B:
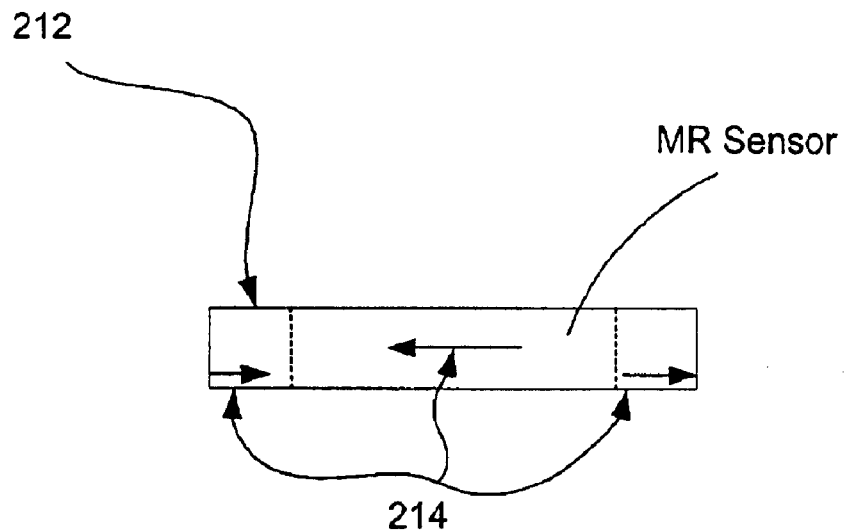
FIG. 2B illustrates the MR sensor and the placement of the domain wall of FIG. 2A.

In operation, the ferromagnetic hard bias layer HB reduces noise associated with use of the MR sensor. This is accomplished by stabilizing the free layer 510 of the MR sensor 500 through an "exchange coupling" between the hard bias layer HB and the free layer 510 of the MR sensor 500. Such exchange coupling combats the effects of the domain wall mentioned during reference to FIGS. 2A and 2B by preventing the ends of the MR sensor 500 from reversing polarity. By overcoming the effects of the domain wall, the hard bias layer HB of the present invention lowers noise, and a required thickness of the hard bias layer HB is reduced.

Figure 7:
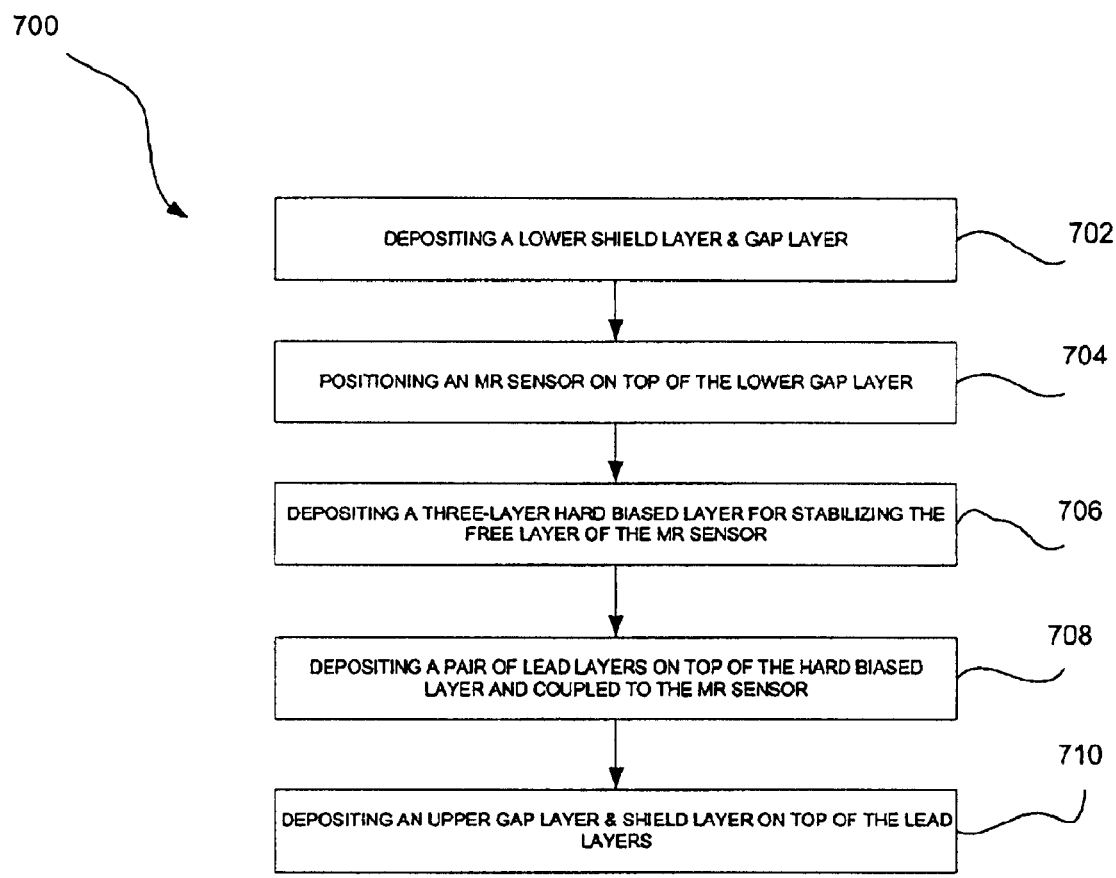
FIG. 7 illustrates a method for fabricating the MR read head of FIG. 6, in accordance with one embodiment.

FIG. 7 illustrates a method 700 for fabricating the MR read head of FIG. 6, in accordance with one embodiment. As shown, the lower shield layer S1 lower gap layer G1 are deposited in operation 702 after which an MR sensor 500 is positioned on top of the lower gap layer G1. See operation 704. It should be noted that the MR sensor 500 may be fabricated using a well known process involving photolithography.

Next, in operation 706, a three-layer hard bias layer HB is deposited on top of the lower shield layer S1 for stabilizing the free layer 510 of the MR sensor 500. Such deposition may include depositing the lower layer 600 constructed with Fe on the lower gap layer G1. Thereafter, the seed layer 604 may be deposited followed by the upper layer 602.

As mentioned earlier, the hard bias layer HB includes a ferromagnetic material for stabilizing the free layer 510 of the MR sensor 500. This may be accomplished by the hard bias layer HB including a lower layer 600 constructed with Fe.

Next, the pair of lead layers L1 and L2 are deposited on top of the hard bias layer HB and coupled to the MR sensor. The upper gap layer G2 and upper shield layer S2 are subsequently positioned on top of the lead layers L1 and L2.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive (MR) read head, comprising:
   a lower shield layer;
   a lower gap layer located above the lower shield layer;
   an MR sensor located above the lower gap layer, the MR sensor including a free layer and a pinned layer;
   a three-layer hard bias layer located above the lower gap layer for stabilizing the free layer of the MR sensor, wherein a lower layer of the hard bias layer is constructed of an electrically conductive material, the hard bias layer being positioned substantially outside a physical width of the MR sensor;
   a pair of lead layers located above the hard bias layer and coupled to the MR sensor;
   an upper gap layer located above the lead layers; and
   an upper shield layer located above the upper gap layer;
   wherein a product of the magnetic moment (Ms) and the thickness (t) of the lower layer of the hard bias layer is greater than a product of the magnetic moment (Ms) and the thickness (t) of the free layer of the MR sensor.

2. A magnetoresistive (MR) read head, comprising:
   a lower shield layer;
   a lower gap layer located above the lower shield layer;
   an MR sensor located above the lower gap layer, the MR sensor including a free layer and a pinned layer;
   a three-layer hard bias layer located above the lower gap layer for stabilizing the free layer of the MR sensor, wherein a lower layer of the hard bias layer is constructed of an electrically conductive material;
   a pair of lead layers located above the hard bias layer and coupled to the MR sensor;
   an upper gap layer located above the lead layers; and
   an upper shield layer located above the upper gap layer;
   wherein a product of the magnetic moment (Ms) and the thickness (t) of the lower layer of the hard bias layer is greater than a product of the magnetic moment (Ms) and the thickness (t) of the free layer of the MR sensor.

3. The MR read head as recited in claim 2, wherein the hard bias layer includes an upper layer constructed with Cr.

4. The MR read head as recited in claim 3, wherein the upper layer of the hard bias layer is constructed with CoPtCr.

5. The MR read head as recited in claim 3, wherein the hard bias layer includes a seed layer constructed with FeCr.

6. The MR read head as recited in claim 2, wherein the hard bias layer includes a seed layer constructed with CoFeCr.

7. The MR read head as recited in claim 2, wherein the hard bias layer includes a lower layer constructed with Fe.

8. The MR read head as recited in claim 7, wherein the lower layer of the hard bias layer is constructed with $Co_{50}Fe_{50}$.

9. The MR read head as recited in claim 2, wherein a product of the magnetic moment (Ms) and the thickness (t) of the hard bias layer is at least six times greater than a product of the magnetic moment (Ms) and the thickness (t) of the free layer of the MR sensor.

10. The MR read head as recited in claim 9, wherein a product of the magnetic moment (Ms) and the thickness (t) of the hard bias layer is at least eight times greater than a product of the magnetic moment (Ms) and the thickness (t) of the free layer.

11. The MR read head as recited in claim 2, wherein the MR read head is a lead overlay read head.

12. The MR read head as recited in claim 2, wherein the hard bias layer reduces noise associated with use of the MR sensor.

13. A method for fabricating a magnetoresistive (MR) read head, comprising:

depositing a lower shield layer;

depositing a lower gap layer above the lower shield layer;

positioning an MR sensor above the lower gap layer, the MR sensor including a free layer and a pinned layer;

depositing a three-layer hard bias layer above the lower gap layer for stabilizing the free layer of the MR sensor, wherein a lower layer of the hard bias layer is constructed of an electrically conductive material, the hard bias layer being positioned substantially outside a physical width of the MR sensor;

depositing a pair of lead layers above the hard bias layer and coupled to the MR sensor;

depositing an upper gap layer above the lead layers; and depositing an upper shield layer above the upper gap layer;

wherein a product of the magnetic moment (Ms) and the thickness (t) of the lower layer of the hard bias layer is greater than a product of the magnetic moment (Ms) and the thickness (t) of the free layer of the MR sensor.

14. A method for fabricating a magnetoresistive (MR) read head, comprising:

depositing a lower shield layer;

depositing a lower gap layer above the lower shield layer;

positioning an MR sensor above the lower gap layer, the MR sensor including a free layer and a pinned layer;

depositing a three-layer hard bias layer above the lower gap layer for stabilizing the free layer of the MR sensor, wherein a lower layer of the hard bias layer is constructed of an electrically conductive material;

depositing a pair of lead layers above the hard bias layer and coupled to the MR sensor;

depositing an upper gap layer above the lead layers; and depositing an upper shield layer above the upper gap layer;

wherein a product of the magnetic moment (Ms) and the thickness (t) of the lower layer of the hard bias layer is greater than a product of the magnetic moment (Ms) and the thickness (t) of the free layer of the MR sensor.

15. The method as recited in claim 14, wherein the hard bias layer includes an upper layer constructed with Cr.

16. The method as recited in claim 15, wherein the hard bias layer is constructed with CoPtCr.

17. The method as recited in claim 15, wherein the hard bias layer includes a seed layer constructed with FeCr.

18. The method as recited in claim 15, wherein the hard bias layer includes a seed layer constructed with CoFeCr.

19. The method as recited in claim 14, wherein the hard bias layer includes a lower layer constructed with Fe.

20. The method as recited in claim 19, wherein the lower layer of the hard bias layer is constructed with $Co_{50}Fe_{50}$.

21. The method as recited in claim 14, wherein a product of the magnetic moment (Ms) and the thickness of the hard bias layer is at least six times greater than a product of the magnetic moment (Ms) and the thickness (t) of the free layer of the MR sensor.

22. The method as recited in claim 21, wherein a product of the magnetic moment (Ms) and the thickness (t) of the hard bias layer is at least eight times greater than a product of the magnetic moment (Ms) and the thickness (t) of the free layer.

23. The method as recited in claim 14, wherein the MR read head is a lead overlay read head.

24. The method as recited in claim 14, wherein the hard bias layer reduces noise associated with use of the MR sensor.

25. A magnetoresistive (MR) read head, comprising:

a lower shield layer;

a lower gap layer located above the lower shield layer;

an MR sensor located above the lower gap layer;

a hard bias lower layer located above the lower gap layer, the hard bias lower layer including Co and Fe, wherein a product of the magnetic moment (Ms) and the thickness (t) of the lower layer of the hard bias layer is greater than a product of the magnetic moment (Ms) and the thickness (t) of the free layer of the MR sensor;

a hard bias seed layer located above the hard bias lower layer, the hard bias seed layer including Fe and Cr;

a hard bias upper layer located above the hard bias seed layer, the hard bias upper layer including Co, Pt and Cr;

a pair of lead layers located above the hard bias upper layer and coupled to the MR sensor;

an upper gap layer located above the lead layers; and an upper shield layer located above the upper gap layer.

26. The MR read head as recited in claim 25, wherein the hard bias seed layer further includes Co.

27. A magnetoresistive (MR) read head, comprising:

a lower shield layer;

a lower gap layer located above the lower shield layer;

an MR sensor located above the lower gap layer, the MR sensor including a free layer and a pinned layer;

a hard bias layer located above the lower gap layer for stabilizing the free layer of the MR sensor, the hard bias layer including a seed layer constructed from ferromagnetic material with a body centric cubic (BCC) crystallographic structure that is magnetically coupled to the MR sensor and a remaining portion of the hard bias layer, wherein a lower layer of the hard bias layer is constructed of an electrically conductive material;

a pair of lead layers located above the hard bias layer and coupled to the MR sensor;

an upper gap layer located above the lead layers; and an upper shield layer located above the upper gap layer;

wherein a product of the magnetic moment (Ms) and the thickness (t) of the lower layer of the hard bias layer is greater than a product of the magnetic moment (Ms) and the thickness (t) of the free layer of the MR sensor.

28. A disk drive system, comprising:

a magnetic recording disk;

a magnetoresistive (MR) read head including:
    a lower shield layer;
    a lower gap layer located above the lower shield layer;
    an MR sensor located above the lower gap layer, the MR sensor including free layer and a pinned layer,
    a three-layer hard bias layer located above the lower gap layer for stabilizing the free layer of the MR sensor, wherein a lower layer of the hard bias layer is constructed of an electrically conductive material,
    a pair of lead layers located above the hard bias layer and coupled to the MR sensor,
    an upper gap layer located above the lead layers, and
    an upper shield layer located above the upper gap layer;
    wherein a product of the magnetic moment (Ms) and the thickness (t) of the lower layer of the hard bias layer is greater than a product of the magnetic moment (Ms) and the thickness (t) of the free layer of the MR sensor;

an actuator for moving the MR read head across the magnetic recording disk so the MR read head may access different regions of magnetically recorded data on the magnetic recording disk; and a controller electrically coupled to the MR read head for detecting changes in resistance of the MR read head.

\* \* \* \* \*